United States Patent
Urata et al.

(10) Patent No.: US 7,751,554 B2
(45) Date of Patent: Jul. 6, 2010

(54) SOUND INFORMATION PROVIDING SYSTEM

(75) Inventors: Yasuhiro Urata, Suginami-ku (JP);
Toshihiko Ishiba, Nerima-ku (JP);
Naohisa Yokota, Setagaya-ku (JP);
Hiroshi Kawahashi, Soka (JP)

(73) Assignee: NTT DoCoMo, Inc., Tokyo (JP)

( * ) Notice: Subject to any disclaimer, the term of this patent is extended or adjusted under 35 U.S.C. 154(b) by 1019 days.

(21) Appl. No.: 11/079,101

(22) Filed: Mar. 15, 2005

(65) Prior Publication Data

US 2005/0207563 A1 Sep. 22, 2005

(30) Foreign Application Priority Data

Mar. 17, 2004 (JP) ............................. 2004-076953

(51) Int. Cl.
*H04M 1/00* (2006.01)
(52) U.S. Cl. .................................. 379/386; 379/207.16
(58) Field of Classification Search ................. 379/377, 379/386, 372, 88.17
See application file for complete search history.

(56) References Cited

U.S. PATENT DOCUMENTS

| | | | |
|---|---|---|---|
| 5,509,075 A * | 4/1996 | Grube et al. ................. | 380/250 |
| 6,633,841 B1 * | 10/2003 | Thyssen et al. ............. | 704/233 |
| 2003/0002657 A1 | 1/2003 | Seelig et al. | |
| 2003/0231749 A1 | 12/2003 | Ansley et al. | |
| 2004/0114732 A1 * | 6/2004 | Choe et al. ............... | 379/88.17 |
| 2004/0174983 A1 * | 9/2004 | Olschwang et al. ......... | 379/377 |

FOREIGN PATENT DOCUMENTS

| | | |
|---|---|---|
| GB | 2 344 020 | 5/2000 |
| JP | 61-084133 | 4/1986 |
| JP | 07-087185 | 3/1995 |
| JP | 10-013572 | 1/1998 |
| JP | 2001-326732 | 11/2001 |
| JP | 2002-33801 | 1/2002 |
| JP | 2003-110705 | 4/2003 |
| JP | 2004-088452 | 3/2004 |
| KR | 2002-0097077 | 12/2002 |
| WO | WO 03/003235 A1 | 1/2003 |
| WO | WO 2004/100516 A1 | 11/2004 |

OTHER PUBLICATIONS

Michiko Nagai, "Melody Call", http://japan.cnet.com/news/com/story/0, 2000056021, 20061056,00htm, Sep. 24, 2003 pp. 1-2 (with English translation).

* cited by examiner

*Primary Examiner*—Curtis Kuntz
*Assistant Examiner*—Amal Zenati
(74) *Attorney, Agent, or Firm*—Oblon, Spivak, McClelland, Maier & Neustadt, L.L.P.

(57) ABSTRACT

A sound information providing system, which can eliminate inappropriate sound information, is provided. The sound information providing system includes a receiving unit that receives a phone number for identifying a cellular phone of the destination side and a phone number for identifying a cellular phone of the source side. Both information is transmitted from the cellular phone of the source side, a sound information requesting unit for requesting sound information based on the received phone number. A sound information monitoring unit monitors the sound information are output in response to the request. It eliminates inappropriate sound information, and selects the sound information conforming to a predefined condition. A transmitting unit transmits the selected sound information to the cellular phone.

4 Claims, 4 Drawing Sheets

Fig.2

| DESTINATION USER NUMBER | SOURCE USER NUMBER | SPECIFIED TIME | SPECIFIED DAY OF THE WEEK | SOUND SOURCE ID |
|---|---|---|---|---|
| 090-XXXX-YYYY | NO SPECIFICATION | NO SPECIFICATION | NO SPECIFICATION | MUSIC 01 |
| | 090-XXXX-YYYY | 12:00 TO 18:00 | SATURDAY | ADVERTISEMENT 01 |
| ... | ... | ... | ... | ... |

| SOUND SOURCE ID | SOUND INFORMATION |
|---|---|
| MUSIC 01 | music01.wav |
| MUSIC 02 | music02.wav |
| ⋮ | ⋮ |

(B)

| SOUND SOURCE ID | SOUND INFORMATION |
|---|---|
| ADVERTISEMENT 01 | ad01.wav |
| ADVERTISEMENT 02 | ad02.wav |
| ⋮ | ⋮ |

SOUND INFORMATION PROVIDING SYSTEM

BACKGROUND OF THE INVENTION

1. Field of the Invention

The present invention relates to a sound information providing system.

2. Related Background Art

When an original call is transmitted, to other communication terminals, from a communication terminal (including a stationary phone, a mobile terminal, a facsimile communication instrument, etc. likewise hereafter) which can generate sounds based on the information transmitted via a communication network, sounds such as a dial tone (DT), a ring back tone (RBT), or a busy tone (BT) may be output from the receiving unit of the communication terminal which originated the call, depending on the situation of the calling action. These sounds are electric signals transmitted from a switchboard through the communication network, subsequently converted into and output as sounds. Thus, the sounds are predefined. On the contrary, a technique such as described in the following patent literature 1 is known, which can set arbitrary sounds as DT, RBT, or BT.

[Patent literature 1] Japanese Patent Application Publication No. 2002-33801

SUMMARY OF THE INVENTION

Now, there is a need to acquire sound information for generating the above mentioned sounds from an external server. However, provision of inappropriate sounds may be hazardous for telecommunication carriers to guarantee the security of communication.

It is, therefore, an object of the present invention to provide a sound information providing system which can eliminate inappropriate sound information.

[Means for solving the Problem]

The sound information providing system of the present invention transmits sound information to a communication terminal which can generate predefined sounds based on the sound information transmitted from a network when the communication terminal calls other communication terminals, comprises (1) a receiving means for receiving second terminal specific information for identifying a second communication terminal of the destination side and first terminal specific information for identifying a first communication terminal of the source side, both information transmitted from the first communication terminal of the source side; (2) a sound information requesting means for requesting sound information based on received the first terminal specific information and the second terminal specific information; (3) a sound information monitoring means for monitoring the sound information being output in response to the request, eliminating inappropriate sound information, and selecting the sound information conforming to a predefined condition; and (4) a transmitting means for transmitting the selected sound information to the first communication terminal.

According to the sound information providing system of the present invention, inappropriate sound information can be eliminated because the sound information being output is selected depending on whether or not it meets a predefined condition.

Preferably, in the sound information providing system of the present invention, the sound information monitoring means may also determine that the sound information being output is inappropriate if the sound information is substantially identical with a predefined sound source pattern. Since the sound source pattern corresponding to inappropriate sound information can be set preliminarily, inappropriate sound information can be readily eliminated.

In addition, according to the request of sound information requesting means in the sound information providing system of the present invention, certified information is embedded in the sound information being output and preferably the sound information monitoring means selects the output sound information if the embedded certified information is valid. Since the sound information is determined to be appropriate if the certified information is valid, inappropriate sound information can be eliminated more adequately.

According to the present invention, a sound information providing system which is capable of eliminating inappropriate sound information can be provided.

BRIEF DESCRIPTION OF THE DRAWINGS

The present invention may be more readily described with reference to the accompanying drawings, in which:

FIG. 2 is a diagram showing an example of information stored in a setting information storing unit shown in FIG. 1;

FIG. 3 is a diagram showing an example of information stored in a music information server and an advertising information server shown in FIG. 1.

DESCRIPTION OF THE PREFERRED EMBODIMENTS

Teachings of the present invention can be readily understood by considering the following detailed description with reference to the accompanying drawings, which are shown only by reason of illustration. The embodiments of the present invention will be described next, in conjunction with the accompanying drawings. Whenever possible, identical elements are provided with identical numerals, and duplicate description is omitted.

Figure 1:
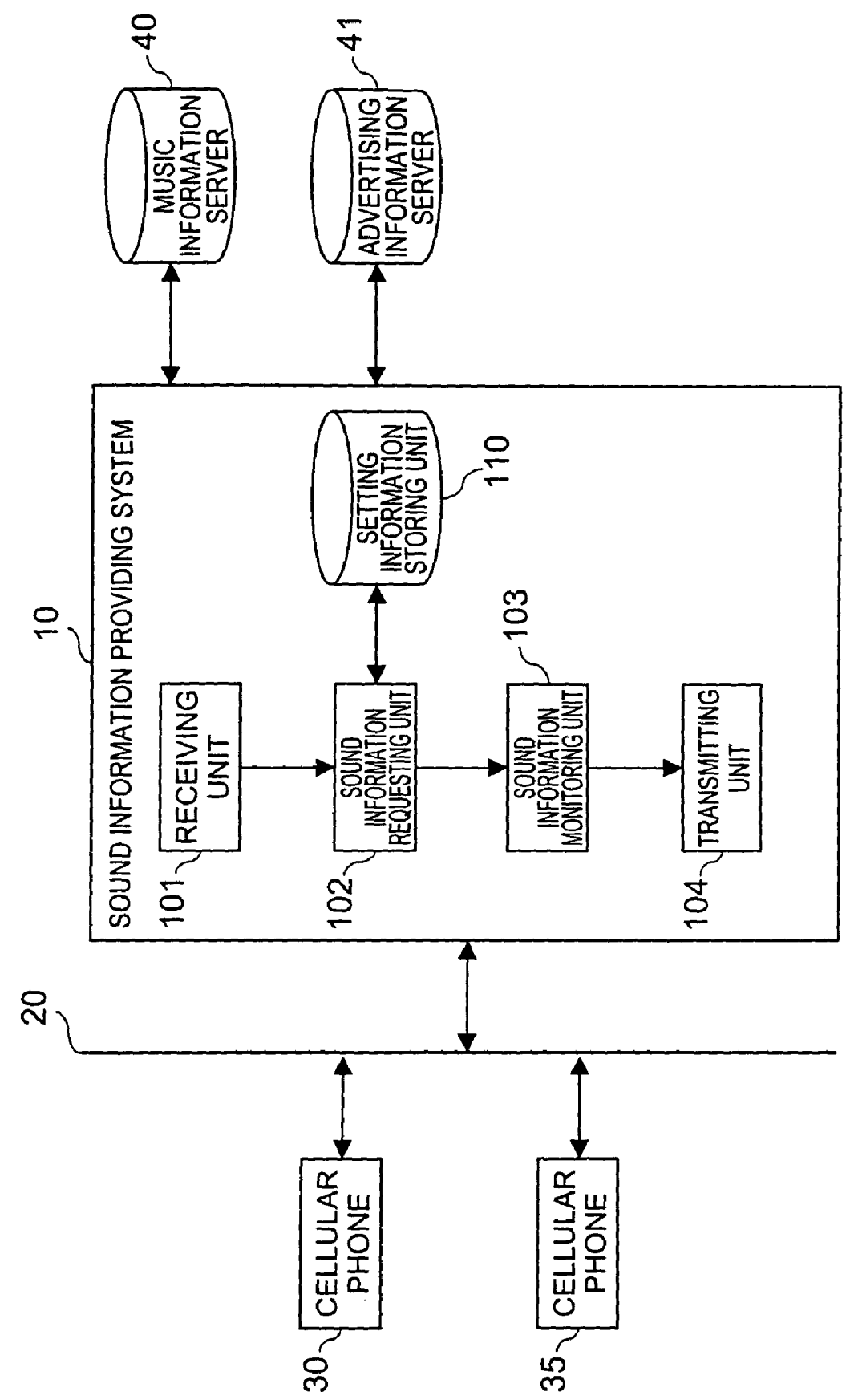
FIG. 1 is a diagram showing an arrangement of a sound information providing system according to the present embodiment.

FIG. 1 is a diagram showing an arrangement of the present embodiment. A sound information providing system 10 is arranged to be capable of transmitting sound information to a cellular phone 30 (communication terminal) and a cellular phone 35 (communication terminal) via a mobile communication network 20. The sound information providing system 10 is arranged to be capable of transmitting and receiving information mutually with both of a music information server 40 and an advertising information server 41. The cellular phone 30 and the cellular phone 35, being cellular phones used by users utilizing the sound information providing system 10, are arranged to be capable of both voice and data communications. Here, in the present embodiment, the description will be provided for an example wherein a call is transmitted from the cellular phone 30 to the cellular phone 35.

The sound information providing system 10 will be described next. The sound information providing system 10 is physically composed as a computer system (or an assembly of computer systems) comprising a CPU (central processing unit), a memory, input devices such as a mouse and a keyboard, presentation devise such as a display, a storage device such as a hard disk, a communication device such as a modem.

The sound information providing system 10 comprises, as functional components, a receiving unit 101 (a receiving means), a sound information requesting unit 102 (a sound information requesting means), a sound information monitoring unit 103 (a sound information monitoring means), a transmitting unit 104 (a transmitting means), and a setting information storing unit 110. Each of the components will be explained in detail below.

The receiving unit 101 is a component for receiving, second terminal specific information for identifying the cellular phone 35 (a second communication terminal) of the destination side, and first terminal specific information for identifying the cellular phone 30 of the source side, both information transmitted from the cellular phone 30 of the source side. In the present embodiment, it is assumed that each of the first terminal specific information and the second terminal specific information is the phone number of respective terminal. The receiving unit 101 outputs the received phone number to the sound information requesting unit 102.

The sound information requesting unit 102 is a component for requesting sound information based on the phone number output from the receiving unit 101. More specifically, the sound information requesting unit 102 identifies, based on the output phone number, a sound source ID from the information stored in the setting information storing unit 110, and requests a server corresponding to the identified sound source ID to transmit sound information.

Now, the information stored in the setting information storing unit 110 will be described. FIG. 2 is a diagram showing an example of information stored in the setting information storing unit 110. According to the example shown in FIG. 2, a "destination user number" (second terminal specific information), a "source user number" (first terminal specific information), a "specified time", a "specified day of the week", and a "sound source ID" are related together and stored. The "destination user number" is key information for specifying the "specified time", the "specified day of the week", and the "sound source ID" corresponding to the "destination user number", when a call is transmitted to the phone number corresponding to this "destination user number". The "source user number" is key information for specifying other information corresponding to the "source user number", when a call is transmitted from a cellular phone having a phone number corresponding to this "source user number". The "specified time" and the "specified day of the week" are limiting information for obeying conditions if this information is specified. The "sound source ID" is information for specifying the sound information to be provided to the cellular phone 30.

If a music-related ID is selected as the sound source ID, the sound information requesting unit 102 transmits the selected sound source ID to the music information server 40. In addition, if an advertisement-related ID is selected as the sound source ID, the sound information requesting unit 102 transmits the selected sound source ID to the advertising information server 41.

Now, the information stored in the music information server 40 and the advertising information server 41 will be described. FIG. 3(A) shows an example of information stored in the music information server 40, and FIG. 3(B) shows an example of information stored in the advertising information server 41, respectively. In the music information server 40, the "sound source ID" and the "sound information" are associated and stored. Also in the advertising information server 41, the "sound source ID" and the "sound information" are associated and stored. The music information server 40 and the advertising information server 41 select sound information corresponding to the sound source ID transmitted from the sound information requesting unit 102, and transmit the selected information to the sound information requesting unit 102.

In FIG. 2, "090-XXXX-YYYY" stored as the source user number is the phone number of the cellular phone 30. Thus, if the user employing the cellular phone 30 calls "090-XXXX-XXXX" (cellular phone 35) stored as the destination user number, between the time "12:00 and 18:00" on "Saturday", the sound source ID of an "advertisement 01" is specified and the sound information of "ad01.wav" is transmitted from the advertising information server 41. The sound information requesting unit 102 outputs the received sound information to the sound information monitoring unit 103 together with the phone number.

The sound information monitoring unit 103 is a component for monitoring the sound information being output from the sound information requesting unit 102, eliminating inappropriate sound information, selecting the sound information conforming to a predefined condition, and outputting it to the transmitting unit 104. More specifically, the sound information monitoring unit 103 determines the sound information to be inappropriate, if the sound information is identical with a predefined sound source pattern. Examples of sound source patterns include sound patterns such as silence, a failure sound, or a busy tone, which may be suggestive for the user of communication system trouble, or sound patterns such as screaming or any other filthy noise, which may cause discomfort to the user. In addition, certified information may be embedded in the sound information. In this case, since the sound information is encrypted by a private key when certifying, the sound information monitoring unit 103 determines that the sound information was certified if it can be decoded using a public key. The information monitoring unit 103 terminates the process without outputting the sound information to the transmitting unit 104, if the sound information is determined to be inappropriate.

The transmitting unit 104 is a component for transmitting, to the cellular phone 30, the sound information being output from the sound information monitoring unit 103. More specifically, if "ad01.wav" is output as the sound information and "090-XXXX-YYYY" is output as the phone number, respectively, the transmitting unit 104 transmits the sound information of "ad01.wav" together with phone number of "090-XXXX-YYYY" to the mobile communication network 20, and the sound information "ad01.wav" is transmitted from the mobile communication network 20 to the cellular phone 30 specified by the phone number "090-XXXX-YYYY". In the mobile communication network 20, transmission of the sound information "ad01.wav" continues until the cellular phone 30 establishes a call connection with the cellular phone 35, and the transmission stops when the call connection is established. For example, if the replay time of the sound information is 30 seconds, and the time taken for establishing the call connection exceeded the period, the mobile communication network 20 keeps transmitting the sound information repeatedly. In the sound information cellular phone 30, a predefined sound is generated as an RBT (ring back tone) based on the sound information "ad01.wav".

Figure 4:
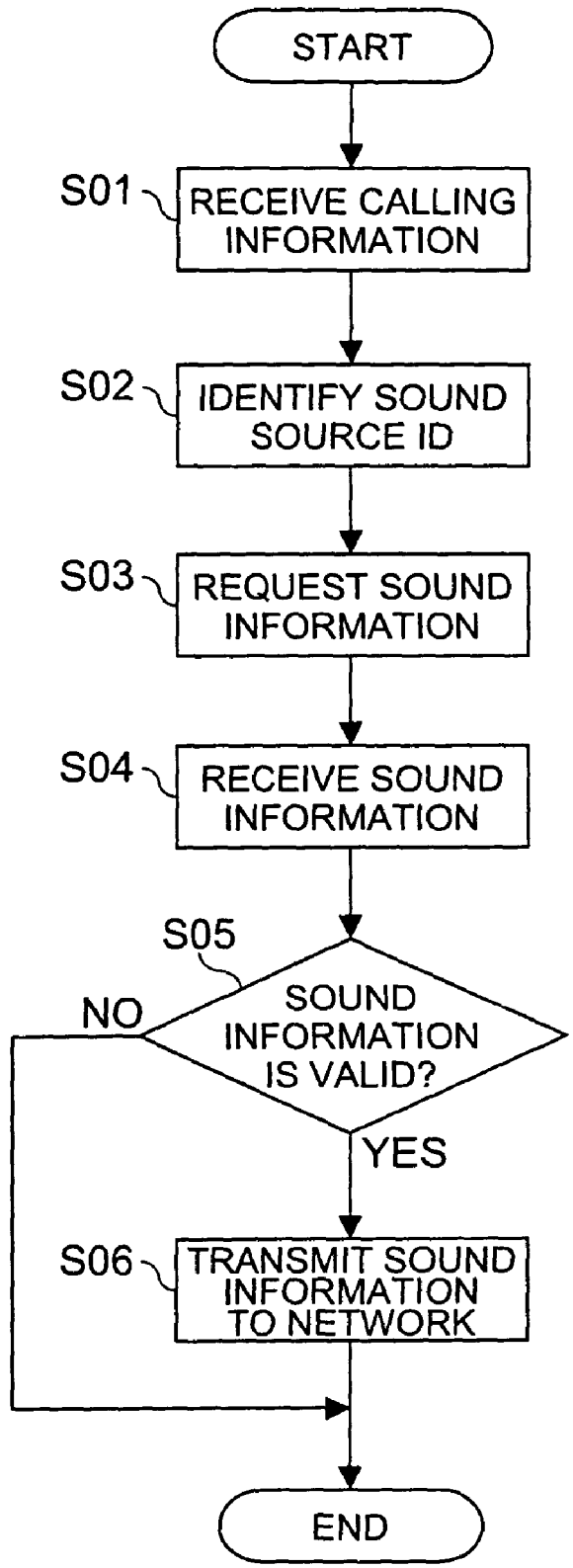
FIG. 4 is a diagram describing the operation of the sound information providing system according to the present embodiment.

Next, the operation of the sound information providing system 10 will be explained with reference to FIG. 4. FIG. 4 is a flowchart for describing the operation of the sound information providing system 10. The receiving unit 101 receives second terminal specific information for identifying the cellular phone 35 of the destination side, and first terminal specific information for identifying the cellular phone 30, both information transmitted from the cellular phone 30 of the source side (step S01) The receiving unit 101 outputs the received phone number to the sound information requesting unit 102.

The sound information requesting unit 102 identifies the sound source ID from the information stored in the setting information storing unit 110, based on the output phone number (step S02). The sound information requesting unit 102 requests a server corresponding to the identified sound source ID to transmit sound information (step S03). The sound information requesting unit 102 receives the sound information transmitted according to the request, and outputs the received sound information to the sound information monitoring unit 103 together with the phone number (step S04).

The sound information monitoring unit 103 monitors the sound information being output from the sound information requesting unit 102, eliminates inappropriate sound information, selects the sound information conforming to a predefined condition, and outputs it to the transmitting unit 104 (step S05). If the information monitoring unit 103 determines that the sound information is inappropriate, it terminates the process without outputting the sound information to the transmitting unit 104. If the sound information monitoring unit 103 outputs the sound information, the transmitting unit 104 transmits the sound information and the phone number to the mobile communication network 20 (step S06).

According to the present embodiment, inappropriate sound information can be eliminated, since the sound information transmitted from the music information server 40 or the advertising information server 41 is selected according to whether or not a predefined condition is satisfied.

What is claimed is:

1. A sound information providing system for transmitting sound information via a network to a mobile communication terminal which can generate predefined sounds based on the sound information transmitted from the network, when the mobile communication terminal calls other mobile communication terminals, the sound information providing system comprising:
   a receiving means for receiving second terminal specific information for identifying a second mobile communication terminal of the destination side and first terminal specific information for identifying a first mobile communication terminal of the source side, both information being transmitted from the first mobile communication terminal of the source side;
   a sound information requesting means for requesting sound information from among sound information servers each including a sound source based on the received first terminal specific information and second terminal specific information;
   a sound information monitoring means for judging whether sound information being output from the servers existing outside the sound information providing system in response to the request is identical with a predefined sound source pattern; and
   a transmitting means for transmitting the sound information to the first mobile communication terminal in case the sound information is judged not identical with the sound source pattern by the sound information monitoring means, and
   for avoiding transmitting the sound information to the first mobile communication terminal in case that the sound information is judged identical with the sound source pattern by the sound information monitoring means.

2. The sound information providing system according to claim 1, wherein certified information is embedded in the sound information being output in response to the request of the sound information requesting means, and the sound information monitoring means executes the judging if the embedded certified information is valid.

3. A sound information providing system for transmitting sound information via a network to a mobile communication terminal which can generate predefined sounds based on the sound information transmitted from the network, when the communication terminal calls other mobile communication terminals, the sound information providing system comprising:
   a receiving device configured to receive second terminal specific information for identifying a second mobile communication terminal of the destination side and first terminal specific information for identifying a first mobile communication terminal of the source side, both information being transmitted from the first mobile communication terminal of the source side;
   a sound information requesting device configured to request sound information from among sound information servers each including a sound source based on the received first terminal specific information and second terminal specific information;
   a sound information monitoring device configured to judge whether sound information being output from the servers existing outside the sound information providing system in response to the request is identical with a predefined sound source pattern; and
   a transmitting device configured to transmit the sound information to the first mobile communication terminal in case the sound information is judged not identical with the sound source pattern by the sound information monitoring device, and
   to avoid transmitting the sound information to the first mobile communication terminal in case that the sound information is judged identical with the sound source pattern by the sound information monitoring device.

4. The sound information providing system according to claim 3, wherein certified information is embedded in the sound information being output in response to the request of the sound information requesting device, and the sound information monitoring device executes the judging if the embedded certified information is valid.

* * * * *